Feb. 6, 1962     E. A. STALKER     3,019,512
JOINT CONSTRUCTION
Filed Sept. 3, 1957     2 Sheets-Sheet 1
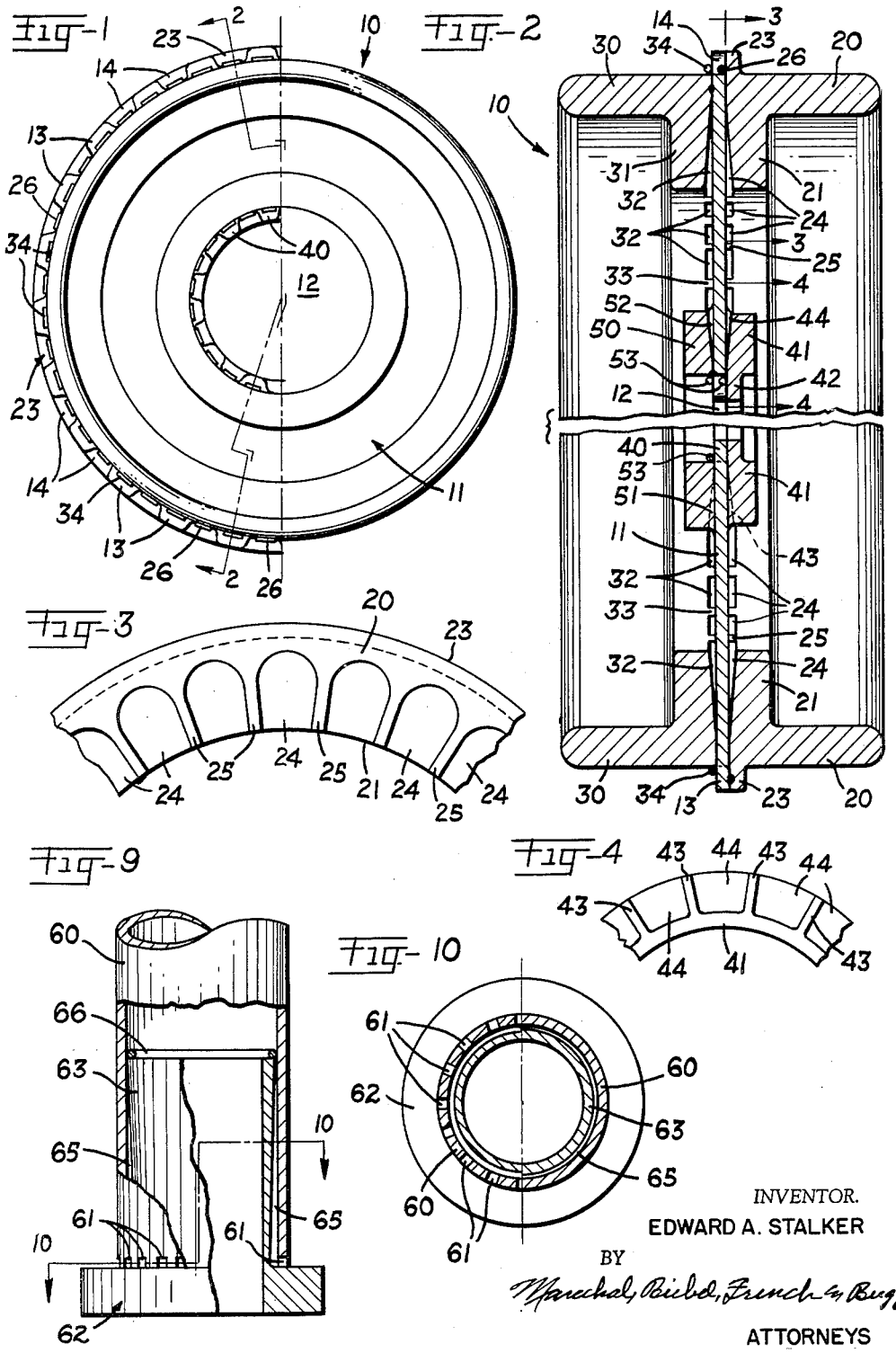
INVENTOR.
EDWARD A. STALKER
BY
ATTORNEYS Feb. 6, 1962  E. A. STALKER  3,019,512
JOINT CONSTRUCTION
Filed Sept. 3, 1957  2 Sheets-Sheet 2
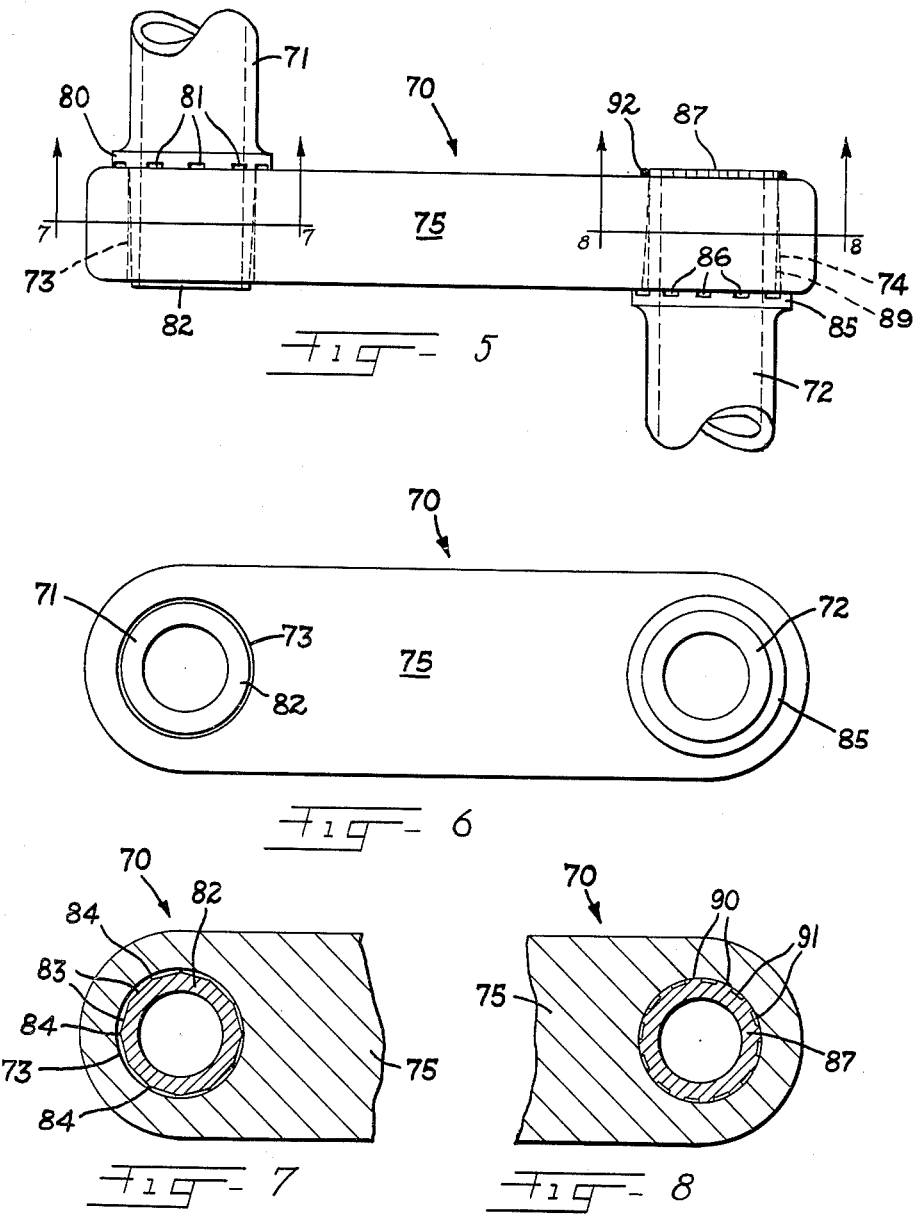
INVENTOR.
EDWARD A. STALKER
BY
ATTORNEYS United States Patent Office 3,019,512
Patented Feb. 6, 1962

3,019,512
JOINT CONSTRUCTION
Edward A. Stalker, 409 1st St., Bay City, Mich.
Filed Sept. 3, 1957, Ser. No. 681,844
9 Claims. (Cl. 29—156.8)

This invention relates to methods for bonding separate components into an integral structure and more particularly to an improved method for achieving complete dispersion of the bonding material between adjoining surfaces to be united.

When joining adjacent surfaces of separate components to bond the components into a unitary structure by flowing bonding material between the adjoining surfaces, the bonding material will flow more readily at and immediately adjacent the locations where the surfaces are closest together, these locations being the regions of maximum capillarity. As a practical matter it is often economically infeasable to prepare the surfaces of many parts with the finish required to form the mating relationship essential to proper flow of bonding material. In such cases the bonding material will flow unequally in different directions and cause large areas to be left without any bonding material joining them together.

In certain structures, such as rotor hubs used in manufacturing compressors, turbines and the like, it is essential that the bonding material completely fill the bonding area between adjoining surfaces so that the final product will have the required mechanical strength to resist the forces exterted against or created in them. In such rotor hubs, and in mating cylindrical parts, it is often the case that the bonding material will flow from one edge of the bonding space to the other prior to the time that the bonding space becomes completely filled in the lateral or transverse direction. Where the edges toward which the bonding material is flowing are close together, the material will flow rapidly along the entire edge before the bonding space is filled, for the reasons set forth above, and gas pockets thus left will impede the further filling of the bonding space necessary to achievement of an integral bond.

A primary object of this invention is to provide a method for joining separate components into a unitary structure which facilitates complete dispersion of the bonding agent between the components to form an integral bond.

Another object of this invention is to provide a method for bonding separate components into an integral structure in which the bonding material will flow rapidly transversely of a bonding space between the components as it progresses from one end of the space to the other.

Another object of this invention is to provide a construction for joints and the like providing for bonding of separate components into a unitary structure with fluid bonding materials.

Other objects and advantages of this invention will be apparent from the following description, the accompanying drawings and the appended claims.

In the drawings—

FIG. 1 is a top plan of a rotor hub structure according to the present invention showing half of the hub in the form it assumes for bonding and the remainder in the completed form;

FIG. 2 is a sectional view taken along the line 2—2 of FIG. 1;

FIG. 3 is a fragmentary view of one of the rim members of the hub structure taken along the line 3—3 of FIG. 2;

FIG. 4 is a fragmentary elevation showing the construction of the inner rim member taken along the line 4—4 of FIG. 2;

FIG. 5 is a side elevation of an assembly showing the manner in which the present method is adapted to cylindrical elements;

FIG. 6 is a bottom plan view of the assembly shown in FIG. 5;

FIG. 7 is a sectional view taken along the line 7—7 of FIG. 5;

FIG. 8 is a fragmentary sectional view taken along the line 8—8 of FIG. 5;

FIG. 9 is a side elevation of a cylindrical assembly showing another manner for joining cylindrical elements, with portions being shown in section; and FIG. 10 is a cross section view taken substantially along the line 10—10 of FIG. 9.

Since fluid when introduced into a relatively small space between adjoining members will flow most quickly along the surfaces which are relatively close together, it is often the case when bonding two components together that the material will incompletely fill the space and result in an imperfect bond. The present invention overcomes this difficulty by providing a space between the components which tapers in thickness between opposed edge limits so that the capillarity decreases in going from the thinner to the thicker limit. On the other hand the space remains constant along a given line extending transversely of the direction of increasing thickness, thereby rendering the capillarity in the transverse direction substantially constant. By inserting the fluid bonding material into the space adjacent the thinner limit, the material will flow more rapidly in the direction transverse to the direction of increasing thickness so that it completely fills each new increment of the space as the moving fluid front advances toward the thicker end of the space.

There are a number of ways in which a tapered capillary space can be obtained between adjoining surfaces of adjoining individual components. The components can be assembled in a jig, or similar positioning device, so that the surfaces will diverge to form the capillary space or the walls of one, or both of the members can be beveled to form the space. Another means is to form a rib or a plurality of ribs of increasing thickness which extend parallel to the direction of required increasing space thickness so that a tapered space, or a plurality of tapered spaces, is created when a second member is mounted adjacent the ribs. In the case of plate-like circular elements or cylindrical elements the space may be obtained by forming the adjoining walls of the members of decreasing or increasing thickness so that they are in effect beveled.

After the tapered space has been formed, fluid bonding material is introduced into the thinner end of the space and the introduction continued until the bonding space has been completely filled, or filled to the degree required by the particular joint. Since the present method is primarily concerned with forming bonds between metallic components, the bonding material will normally be solder or high temperature brazing material. Such a substance, solid at normal temperatures, is placed at the thinner end of the bonding space and heat applied to cause it to become molten and flow into the space. While the brazing material alone can be heated it is preferred that the entire assembly be heated to prevent premature solidification of the brazing material and insure proper dispersion thereof.

Widespread use of alloy metals, such as stainless steels and other metals forming tenacious, adherent oxide films, requires the use of a flux to destroy the film so that the brazing material will adhere to the metal parts. The flux can be located, prior to heating, at the same location on the assembled parts as the brazing and will melt before the brazing material to precede the brazing material into the bonding space. The parts can also be coated with a flux prior to assembly of the parts, if desired. The flow of flux is identical to the flow of brazing material so that in passing through the space it will contact all of the opposing wall surface, removing dirt and oxide films. Then, as the brazing material melts and follows the flux into the bonding space it will sweep out any excess flux or gas and form an integral bond free of voids or trapped gas pockets. Bonding of certain materials may also be improved by heating them in a slightly reducing or inert atmosphere like hydrogen, carbon monoxide, nitrogen, helium or argon, the particular atmosphere used depending upon the situation during the actual bonding operation.

To illustrate the manner in which the present method is applied to a specific structure, reference is made to FIGS. 1–4 of the drawings which illustrate a novel hub structure for use in compressors, turbines and the like. The hub 10 comprises a disk-like body member 11 having a center opening 12 and a plurality of outwardly extending lugs 13 on the outer periphery thereof. The lugs are preferably uniformly spaced around the outer periphery to form similarly spaced voids 14 between consecutive lugs.

An outer rim member 20, for positioning adjacent the outer periphery of body member 11, has an inwardly extending flange portion 21 and an outwardly extending annular flange 23 whose outer edge is coextensive with the outer edges of the lugs 13. The surface of the portion 21, as shown in FIG. 3, has a plurality of spaced recesses 24 which are separated by radially extending ribs 25. The ribs 25 abut against the face of body member 11 when the rim member 20 is temporarily secured to the body member by means of spot welding prior to the brazing operation. As most clearly shown in FIG. 2, the recesses 24 taper inwardly as they approach the inner periphery of portion 21 so that each of the recesses forms a tapering space between the rim member 20 and body member 11 which increases in thickness from the radially outer toward the inner edge thereof.

Thus between rim member 20 and body member 11 there exists a plurality of capillary bonding spaces disposed at equal angular intervals about the axis of the hub 10. The thickness of each of the capillary spaces remains substantially constant along a line extending transversely of the direction of increasing thickness, i.e., in the peripheral direction, to provide more rapid flow of brazing material in the transverse direction than in the direction of increasing space thickness, i.e., in the radial direction. Complete filling of the recess 24 as the fluid advances from the outer toward the inner edges thereof is thus achieved. When the body member 11 has been assembled with rim member 20 the voids 14 between successive lugs 13 cooperate with annular flange 23 to form pockets for receiving lengths of brazing material 26.

A second outer rim member 30, similar to rim member 20, is temporarily attached to the opposite side of body member 11 by spot welding and differs from rim 20 only in the exclusion of the outwardly extending annular flange. The member 30 has inward extending flange 31 the face of which is formed with a plurality of recesses 32, separated by radially extending ribs 33, and the recesses are tapered to form the plurality of equal angularly distributed bonding spaces. The annular flange is omitted in order that the assembly can be laid on its side, with the rim member 20 on the bottom, and the strips of brazing material 26 situated within voids 14 and similar strips of brazing material 34 placed on top of the lugs 13. Thus when the structure is heated, the brazing material will be located adjacent the thinner end of the bonding spaces for flow into the recesses 24 and 32 when the material becomes molten.

The inner peripheral edge of body member 11 has a plurality of inwardly extending lugs 40 similar to the lugs 14 and receives a rim member 41 with an annular flange 42 which is coextensive with the periphery of the lugs. The rim 41 includes ribs 43 and recesses 44 defining capillary spaces for receiving bonding material, the recesses increasing in thickness in the radially outward direction away from the axis of hub 10. A second inner rim member 50 is placed on the other side of body 11 and it also has ribs 51 and recesses 52 of tapering thickness but does not have the annular flange similar to 42 present on rim 41. As shown, rim members 20 and 41 are on the same side of body 11 so that brazing strips 53 can be placed on flange 42 between lugs 40 and on top of lugs 40 to provide for bonding of the inner rim members 41 and 50 simultaneously with the bonding of the outer rim members 20 and 30.

Prior to assembly of the components the recesses 24 and 44 are formed and can taper in thickness from about 0.002 inch at the thinner end thereof to 0.01 inch at the thickest end thereof, a depth of about 0.007 inch being a preferred average therebetween. The actual taper used for a given assembly will vary depending upon the materials and brazing substances being utilized.

As an example of the steps involved in manufacturing a completed hub, the outer rim members 20, 30 and inner rim members 41, 50 are situated in their assembled positions adjacent the inner and outer peripheries of body member 11 respectively. As previously mentioned, the rim members may be temporarily secured to the body 11 by any suitable means, for example spot welding. Once the rim members are temporarily attached to the body 11 the entire assembly is laid with the body 11 substantially horizontal and rims 20 and 41 beneath the body, the annular flanges 23 and 42 being situated beneath lugs 13 and 40. Suitable strips of brazing material are then placed on the annular flanges between the lugs and additional strips of brazing material are placed on top of the lugs in order that it may flow readily into the narrow end of recesses 24, 32, 44 and 52 after the brazing material has become molten.

After the brazing strips have been properly located, either with or without the use of flux, the entire assembly is placed within a heating furnace and heated to cause the brazing material to become molten. In those cases where oxide film formation is a determining factor, the assembly can be placed within a muffle and surrounded with an inert atmosphere prior to the application of heat to the assembly. As the brazing material melts it is introduced into recesses 24, 32, 44 and 52 where, due to the tapering depth, it will flow more rapidly in the direction transverse that of increasing depth, completely filling each recess as it advances toward the opposite side of the recess. Following the required time period insuring a proper and complete flow of the brazing material between the components, the entire structure is permitted to cool until the brazing material solidifies whereupon it can be removed from the furnace and subsequent machining operations undertaken to remove the lugs and flanges to form the completed rotor hub, as indicated in FIG. 1.

In view of the fact that the body member 11 can be relatively thin, for example 0.040 inch it is essential that the brazing material does not affect the final alloy composition of the rotor hub and that erosion of the component parts be avoided. The lugs 13 and 40 and the annular flanges 23 and 42 therefore serve not only to insure proper introduction of the bonding material into the recesses but also prevent alloying or eroding of the parts making up the hub. Any alloying or eroding which may occur will take place in the lugs and flanges, which are machined away following completion of the bonding operation, so that a final integral bonded rotor hub results which is free of injury from the bonding operation.

A commonly occurring assembly in manufacturing which requires brazing comprises a tubular element into which a plug must be placed. Furthermore because of other conditions, for instance other brazing points on the same structure, the plug must be united while the tube is upright. The walls of the plug within the tube are required to be brazed to the tube with no voids larger than 0.030 inch and preferably with no voids at all. The assembly of such a tube and plug with a void-free bond has been extremely difficult to obtain, even with the application of additional brazing material after the initial heating. This is true even though the parts customarily recommended have clearance of 0.001 to 0.007 inch.

The problem of achieving a void-free bond between cylindrical members can be overcome by forming a tapered space between the walls of the two members to receive the brazing material and cause it to flow by capillary action more rapidly in the peripheral than in the axial direction. This is illustrated in FIG. 9 where a cylindrical tube 60 having a notched lower edge forming openings 61 is seated on the outwardly extending annular flange of a plug member 62. The plug has an upwardly extending cylindrical portion 63 which increases in outer diameter from the lower to the upper end. The increase in diameter between the ends of cylindrical portion 63 results in the formation of a tapered capillary space 65 which increases in thickness from top to bottom so that brazing material will flow more rapidly around the periphery of portion 63 than it will flow in the axial direction. Ths is due to the superior capillary attraction present between the more closely adjoining wall surfaces present near the narrower portion of the space. The inside diameter of tube 60 can be tapered to form the capillary space 65 if desired.

To effect bonding of the tube 60 to the plug 62 a ribbon of solid brazing material 66 is placed on the upper end of cylindrical portion 63 adjacent the junction of the walls of the two members. The entire assembly can then be heated either by inductive heating or by inserting the assembly into a heating furnace, either with or without a controlled atmosphere depending upon the materials used, and the brazing material melted to flow into the tapered space 65. The openings 61 in this case serve as venting means permitting escape of gas and flux, in those cases where flux would be used, thereby obviating the necessity for these materials to escape through the upper end of the space 65. The depth of the openings 61 is less than about 0.007 inch to insure retention of the bonding material when it reaches the bottom of space 65.

FIGS. 5 through 8 illustrate an assembly 70 wherein parts 71, 72 of circular cross section are self positioning within appropriate holes 73, 74 in the bar 75. Referring first to part 71, the part includes a shoulder 80 which abuts against the surface of bar 75 and contains a plurality of radially extending passages 81 on the surface adjacent bar 75. Extending downwardly from shoulder 80 is a stud portion 82 of outer conical shape having a plurality of flats 83 to create a plurality of longitudinally extending edges 84 that cooperate with the wall of the hole 73 into which the stud portion is inserted to properly center the stud therein. The stud portion decreases in outer diameter from a point adjacent shoulder 80 to the lower end thereof so that a number of tapered spaces of increasing depth and hence of decreasing capillary attraction are created between the flats 83 and the wall of the hole 73. Bonding of stud 82 may be effected by positioning brazing material adjacent the outer ends of passages so that it can flow into the upper end of the tapered spaces and bond the stud to bar member 75.

The other cylindrical member 72 is similar to member 71 in that it has a collar 85 abutting against the surface of bar 75, the collar including passages 86, and it also includes a stud portion 87 for insertion into the hole 74 in the bar 75. However, in this instance the external diameter thickness of stud portion 87 is constant and the internal wall diameter of the hole 74 in the bar increases downwardly in the form of a cone shape so that it cooperates with the outer peripheral surface of the stud portion to define bonding space 89 which increases in thickness from top to bottom. The stud portion 87 is also self centering, but rather than having a number of flat surfaces as stud portion 87 it contains a plurality of axially extending ribs 90 which are separated by similarly extending fluid conducting grooves 91. To join these parts the brazing material 92 is placed adjacent the upper end of the stud, which is at the thinner end of the tapered space, so that it will flow downwardly into the grooves 91 and completely fill the grooves as the moving fluid front progresses downwardly, due to the increasing thickness of the spaces resulting from the beveled wall of the holes 73, 74 in bar 75.

While the method herein described constitutes a preferred embodiment of the invention, it is to be understood that this invention is not limited to this precise method and that changes may be made therein without departing from the scope of the invention which is defined in the appended claims.

What is claimed is:

1. In the process of uniting adjoining surfaces of separate components to join the components into an integral structure the steps comprising, forming an annular capillary space of tapering thickness in the longitudinal direction and of substantially uniform thickness in the peripheral direction transverse of the direction of tapering thickness to provide said space with greater capillarity in the transverse direction than in the longitudinal direction, and introducing bonding material adapted to be rendered fluid by heat into said space at the end of least thickness to cause distribution of said bonding material throughout the entire peripheral extent of said space before the material flows into said space in the longitudinal direction.

2. In the process of uniting adjoining surfaces of separate components to join the components into an integral structure the steps comprising, positioning the adjoining surfaces in assembled relationship with respect to each other to form an annular capillary space of uniformly tapering thickness in the longitudinal direction and of substantially uniform thickness in the peripheral direction transverse of the direction of tapering thickness, said space having greater capillarity in the peripheral direction than in said longitudinal direction, introducing bonding material into said space at the end of least thickness to cause distribution of said bonding material throughout the entire peripheral extent of said space before the material flows further into said space in the longitudinal direction.

3. In the process of uniting adjoining surfaces of separate components to join the components into an integral structure the steps comprising, forming the interfitting surfaces of said components so as to have an annular capillary space tapering in thickness in the longitudinal direction and of substantially uniform thickness in the peripheral direction transverse of the direction of tapering thickness to provide said space with greater capillarity in the peripheral direction than in the longitudinal direction, placing brazing material on said surfaces adjacent the thinner end of said space, heating said brazing material to render it molten, and causing the molten brazing material to flow initially by capillary attraction throughout the entire peripheral extent of said space followed by flow in the longitudinal direction toward the end of greater thickness to bond said components into an integral structure substantially free of voids.

4. In the process of uniting adjoining surfaces of separate components to join the components into an integral structure of substantially circular cross section the steps comprising, forming spaced ribs of tapering thickness on one of the adjoining surfaces, positioning the other of said adjoining surfaces against said ribs to form a plurality of capillary grooves tapering uniformly in thickness in the axial direction and of substantially uniform thickness in the peripheral direction transverse of the direction of tapering thickness, said grooves having greater capillarity in the peripheral direction than in the axial direction, placing high temperature brazing material at the junction of said members where said surfaces are closest together, heating said brazing material to render it molten, and causing said brazing material to flow into said grooves filling them in the peripheral direction before the material flows further in the axial direction toward the end of greater thickness.

5. In the process of uniting adjoining surfaces of separate components to join the components into an integral structure of generally circular cross section the steps comprising, constructing one of said members of uniformly tapering thickness to form a beveled surface extending angularly with respect to the other of said surfaces, positioning the surfaces in adjoining relationship to form a capillary space of uniformly tapering thickness in the axial direction between opposite end limits thereof and of substantially uniform thickness in the peripheral direction along a given line extending transversely of the direct tapering thickness, said space having greater capillarity in the peripheral direction than in the axial direction, placing high temperature brazing material at the thinner end limit of said space, heating said brazing material to render it molten, flowing said brazing material into said space to cause distribution throughout the entire peripheral extent of each element of said space followed by flow of the material in the direction of greater thickness to similarly fill the next larger element of said space, and retaining said components in position while cooling until the bonding material solidifies.

6. In the process of joining a generally annular rim member to a body member in the production of a rotor hub for compressors, turbines and the like, the steps comprising constructing a portion of the rim member of gradually decreasing thickness in the radial direction, forming an outwardly extending annular flange on said rim member, constructing a series of angularly spaced lugs on the outer periphery of said body member, positioning said rim portion of decreasing thickness against said body member to create a radially extending capillary passage between said body and said rim of substantially uniform depth in the peripheral direction and increasing in depth in the radial direction, placing high temperature brazing material between each of said peripheral lugs at the narrow end of said passage, and applying heat to said brazing material to render it molten and cause distribution of said brazing material throughout the peripheral extent of said passage followed by flow of said material radially into said passage to form a union between said rim member and said body member substantially free of voids.

7. In the process of joining generally annular rim members to a body member in the production of rotor hubs for compressors, turbines and the like, the steps comprising constructing a portion of the rim members of gradually decreasing thickness in the radial direction, forming an outwardly extending annular flange on one of said rim members, forming a series of angularly spaced lugs on the outer periphery of said body member, positioning said rim portions of decreasing thickness against opposite sides of said body members to create radially extending capillary passages between said body and said rims of substantially uniform depth in the peripheral direction and increasing in depth in the radial direction, placing high temperature brazing material on said annular flange and on said peripheral lugs adjacent the narrow end of said passages, and applying heat to said brazing material to render it molten and cause distribution of said brazing material throughout the entire peripheral extent of said passages before the material flows radially into said passages to form a union between said rim members and said body member substantially free of voids.

8. In the method of joining parts of generally circular cross section the steps comprising tapering the walls of one of said parts to produce a surface having a varying diameter, inserting one of said members within the other to form a capillary space tapering in thickness in the axial direction and of substantially uniform thickness in the peripheral direction transverse to the axial direction, placing brazing material adjacent the smaller end of said tapered space, and heating the parts in assembled relation causing the brazing material to completely fill the space in the peripheral direction followed by flow throughout said space in the axial direction toward the end having increasing thickness.

9. In the method of joining parts adapted to be received one within the other, one of said parts having a cylindrical surface and the other having a conical surface, the steps comprising inserting one of said parts within the other leaving a capillary space therebetween tapering in thickness in the axial direction and of substantially uniform thickness in the peripheral direction, placing brazing material adjacent the smaller end of said tapered space, and heating the parts in assembled relation causing the brazing material to completely fill the space in the peripheral direction followed by flow throughout said space in the axial direction toward the end of increasing thickness.

References Cited in the file of this patent

UNITED STATES PATENTS

| | | |
|---|---|---|
| 463,755 | Homer | Nov. 24, 1891 |
| 2,094,495 | Robinson | Sept. 28, 1937 |
| 2,274,550 | Karmazin | Feb. 24, 1942 |
| 2,598,027 | Weir | May 27, 1952 |

FOREIGN PATENTS

| | | |
|---|---|---|
| 751,582 | Great Britain | June 27, 1956 |